United States Patent
Kataoka et al.

(10) Patent No.: US 7,238,746 B2
(45) Date of Patent: *Jul. 3, 2007

(54) RUBBER COMPOSITION FOR GOLF BALL AND GOLF BALL

(75) Inventors: Nobuyuki Kataoka, Chichibu (JP); Hiroshi Higuchi, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 10/958,268

(22) Filed: Oct. 6, 2004

(65) Prior Publication Data
US 2005/0079928 A1 Apr. 14, 2005

(30) Foreign Application Priority Data
Oct. 7, 2003 (JP) ............................. 2003-347855

(51) Int. Cl.
*A63B 37/06* (2006.01)
*C08L 83/07* (2006.01)

(52) U.S. Cl. .................. 525/105; 525/274; 525/479; 526/279; 473/371; 473/372; 473/377

(58) Field of Classification Search .............. None
See application file for complete search history.

(56) References Cited

U.S. PATENT DOCUMENTS 2,956,044 A * 10/1960 Merker ................ 526/279
4,277,595 A * 7/1981 Deichert et al. ............ 528/26
2001/0011046 A1* 8/2001 Ichikawa et al. ........... 473/371
2004/0249069 A1* 12/2004 Nakai et al. ................ 525/63

FOREIGN PATENT DOCUMENTS

| JP | 60-258236 A | 12/1985 |
|---|---|---|
| JP | 61-258844 A | 11/1986 |
| JP | 08-243191 A | 9/1996 |
| JP | 2001-170213 A | 6/2001 |
| JP | 2001-353233 A | 12/2001 |
| JP | 2002-331046 A | 11/2002 |
| WO | WO- 03/016399 | * 2/2003 |

OTHER PUBLICATIONS

Chemical Abstract of JP60258236 105:44534.*

* cited by examiner

*Primary Examiner*—David J. Buttner
(74) *Attorney, Agent, or Firm*—Sughrue Mion, PLLC

(57) ABSTRACT

A golf ball, typically its core, is manufactured by hot molding a rubber composition comprising a base rubber, an unsaturated carboxylic acid or a metal salt thereof, and an organic peroxide, the base rubber comprising a methacryloxy or acryloxy-modified silicone polymer and optionally, a peroxide-crosslinkable rubber. The golf ball exhibits high rebound and prevents the rebound property from declining at low temperatures.

4 Claims, No Drawings

RUBBER COMPOSITION FOR GOLF BALL AND GOLF BALL

CROSS-REFERENCE TO RELATED APPLICATION

This non-provisional application claims priority under 35 U.S.C. §119(a) on Patent Application No. 2003-347855 filed in Japan on Oct. 7, 2003, the entire contents of which are hereby incorporated by reference.

TECHNICAL FIELD

This invention relates to a rubber composition for a golf ball having improved rebound and minimized rebound decline at low temperature, and a golf ball comprising the composition.

BACKGROUND ART

For the purpose of endowing golf balls with better rebound or resilience, a number of efforts have been made to tailor the formulation of materials for a golf ball. In addition to better rebound, golf balls are required to have many other properties including a soft feel on impact and durability. It is important to achieve a better profile of such properties. To maintain high resilience over a wide temperature range is one of important requirements on golf balls.

The same assignee as the present invention proposed in JP-A 2001-170213 (U.S. Ser. No. 09/732,786) and JP-A 2002-331046 a golf ball which is easy to mold and maintains stable softness and high resilience over a wide temperature range, more specifically a golf ball comprising a portion formed of a composition for a golf ball having blended therein at least one of a silicone rubber powder, a silicone resin powder, and a composite powder thereof. Although this golf ball has established stable rebound over a wide temperature range, there is still a desire to have a golf ball having higher rebound. JP-A 2001-353233 discloses another technique of compounding a powdery silicone component in a material for a golf ball. These compositions still fail to meet the requirements of golfers.

With respect to the compounding of silicone components in materials for golf balls, JP-A 60-258236, JP-A 61-258844, and JP-A 8-243191 also disclose attempts to blend millable silicone rubber with polybutadiene or cover-forming resin wherein the resulting material is subject to peroxide crosslinking. However, it is difficult to achieve a fine dispersion of silicone rubber in polybutadiene rubber or a fine dispersion of polybutadiene rubber in silicone rubber. From the aspects of improving the flow (or injection moldability) of a blend of these two components during golf ball molding that is closely related to the morphology of the blend and the durability of the resulting golf ball, there is a need for a technique capable of accomplishing a better dispersion of the two components.

SUMMARY OF THE INVENTION

An object of the present invention is to provide a rubber composition for a golf ball having improved rebound and minimized rebound decline at low temperature, and a golf ball comprising the composition.

Addressing a rubber composition comprising (A) a base rubber, (B) an unsaturated carboxylic acid and/or a metal salt thereof, and (C) an organic peroxide, the inventor has discovered that a rubber composition obtained by compounding a specific silicone polymer, that is, a methacryloxy and/or acryloxy-modified silicone polymer as the base rubber exhibits improved rebound or resilience and prevents the rebound property from declining at lower temperatures. A golf ball comprising as a constituent component a hot molded product of the rubber composition for a golf ball exhibits high rebound and maintains the rebound property stable over a wide temperature range.

In one aspect, the invention provides a rubber composition for a golf ball comprising (A) a base rubber, (B) an unsaturated carboxylic acid and/or a metal salt thereof, and (C) an organic peroxide, the base rubber (A) comprising (a-1) a methacryloxy and/or acryloxy-modified silicone polymer.

In a preferred embodiment, the methacryloxy and/or acryloxy-modified silicone polymer (a-1) comprises a methacryloxy and/or acryloxy-modified silicone rubber powder. In a preferred embodiment, the base rubber (A) may further comprise (a-2) a peroxide-crosslinkable rubber other than the methacryloxy and/or acryloxy-modified silicone polymer (a-1). The methacryloxy and/or acryloxy-modified silicone polymer (a-1) is desirably present in an amount of 10% to 95% by weight based on the total weight of the methacryloxy and/or acryloxy-modified silicone polymer (a-1) and the peroxide-crosslinkable rubber (a-2). The peroxide-crosslinkable rubber (a-2) typically comprises a polybutadiene containing at least 40% of cis-1,4 bonds.

In another aspect, the invention provides a golf ball comprising as a constituent component a hot molded product of the rubber composition for a golf ball defined above, preferably a golf ball comprising a core formed by hot molding the rubber composition for a golf ball and a cover of at least one layer enclosing the core.

The golf ball of the invention exhibits high rebound and prevents the rebound property from declining at low temperatures. The golf ball is advantageously manufactured using the rubber composition of the invention.

DESCRIPTION OF THE PREFERRED EMBODIMENTS

The rubber composition for a golf ball of the invention comprises (A) a base rubber, (B) an unsaturated carboxylic acid and/or a metal salt thereof, and (C) an organic peroxide. According to the invention, the base rubber (A) comprises (a-1) a methacryloxy and/or acryloxy-modified silicone polymer.

Component (a-1) is preferably an acrylic modified silicone polymer. It is desirably in powder form, that is, a powdered methacryloxy and/or acryloxy-modified silicone rubber. The silicone powder is desired because it is readily miscible with any other rubber, has been partially crosslinked, and facilitates optimization of the hardness of a golf ball.

Suitable silicone polymers that can be used as component (a-1) are commercially available, for example, under the trade name of DY33-719 from Dow Corning-Toray Silicone Co., Ltd.

The base rubber (A) used herein is not particularly limited as long as component (a-1) is included therein. It is preferred from the working aspect that (a-2) a peroxide-crosslinkable rubber other than the methacryloxy and/or acryloxy-modified silicone polymer be compounded along with component (a-1).

The peroxide-crosslinkable rubber (a-2) preferably comprises a polybutadiene having a cis-1,4 bond content of at least 40 wt %, more preferably at least 60 wt %, even more preferably at least 80 wt %, further preferably at least 90 wt %, most preferably at least 95 wt %. A lower cis-1,4 bond content may lead to a rebound decline.

It is recommended that the polybutadiene have a Mooney viscosity ($ML_{1+4}$ (100° C.)) of at least 40, preferably at least 50, more preferably at least 52, and most preferably at least 54, but not more than 140, preferably not more than 120, more preferably not more than 100, and most preferably not more than 80. Too high a Mooney viscosity may adversely affect working whereas too low a Mooney viscosity may lead to reduced rebound. The term "Mooney viscosity" used herein refers to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

It is recommended as well that the polybutadiene have a dispersity Mw/Mn of at least 2.0, preferably at least 2.2, more preferably at least 2.4, most preferably at least 2.6, but up to 8.0, preferably up to 7.5, more preferably up to 4.0, most preferably up to 3.4 (Mw: weight average molecular weight, Mn: number average molecular weight). Too low a dispersity Mw/Mn may adversely affect working whereas too high a dispersity may lead to reduced rebound.

When polybutadiene is used as component (a-2), it may be prepared using any desired polymerization catalysts. Typically nickel, cobalt and rare earth base catalysts may be used. Examples of suitable catalysts include lanthanide series rare-earth compounds, organoaluminum compounds, alumoxane, and halogen-bearing compounds, optionally in combination with Lewis bases. For example, polybutadiene is prepared by polymerizing in the presence of a rare earth base catalyst and reacting a known terminal modifier with the resulting polymer at active ends.

In addition to the polybutadiene, other diene rubbers such as styrene-butadiene rubber, natural rubber, isoprene rubber, ethylene-propylene rubber and the like may be compounded as component (a-2) insofar as the benefits of the invention are not compromised.

In the base rubber, component (a-1) is generally present in an amount of 100% or less, preferably up to 95%, more preferably up to 80%, even more preferably up to 60%, most preferably up to 50% by weight, but at least 10% by weight, based on the total weight of components (a-1) and (a-2). If the proportion of component (a-1) is less than 10% by weight of components (a-1) and (a-2) combined, there can be observed poor rebound or a noticeable rebound decline at low temperatures.

In the rubber composition for a golf ball of the invention, component (B) is compounded with component (A) for the purpose of imparting an appropriate hardness and good rebound to a hot molded product of the composition. Examples of the unsaturated carboxylic acid include acrylic acid, methacrylic acid, maleic acid, and fumaric acid, with acrylic acid and methacrylic acid being most preferred. Suitable metal salts of unsaturated carboxylic acids include zinc and magnesium salts of unsaturated carboxylic acids such as zinc methacrylate and zinc acrylate, with zinc acrylate being most preferred.

An appropriate amount of component (B) compounded per 100 parts by weight of component (A) is generally at least 10 parts, preferably at least 15 parts, more preferably at least 20 parts by weight, but up to 60 parts, preferably up to 50 parts, more preferably up to 45 parts, most preferably up to 40 parts by weight. Too small amounts of component (B) relative to component (A) may lead to rebound decline whereas too much amounts of component (B) may lead to a higher hardness and an uncomfortable feel on impact.

Organic peroxides as component (C) are commercially available, for example, under the trade name of Percumyl D, Perhexa 3M, Perhexa C, Perhexa HC and Perhexa TMH (all manufactured by NOF Corporation) and Luperco 231XL (manufactured by Atochem Co.). A mixture of two or more organic peroxides may be used if desired.

An appropriate amount of component (C) compounded per 100 parts by weight of component (A) is generally at least 0.1 part, preferably at least 0.3 part, more preferably at least 0.5 part, most preferably at least 0.7 part by weight, but up to 5 parts, preferably up to 4 parts, more preferably up to 3 parts, most preferably up to 2 parts by weight. Outside the range, any of good rebound, feel and durability may be lost.

In addition to essential components (A) to (C), an optional inorganic filler may be compounded in the rubber composition for a golf ball of the invention for the purpose of adjusting the specific gravity of the composition for imparting an appropriate weight and good rebound to the golf ball. Suitable inorganic fillers include zinc oxide, barium sulfate and calcium carbonate. An amount of the filler compounded is generally at least 1 part, preferably at least 3 parts, more preferably at least 5 parts, even more preferably at least 7 parts by weight, but up to 130 parts, preferably up to 50 parts, more preferably up to 45 parts, even more preferably up to 40 parts by weight per 100 parts by weight of component (A).

In addition to essential components (A) to (C), an optional antioxidant may be compounded in the rubber composition for a golf ball of the invention as well. Suitable antioxidants are commercially available, for example, under the trade name of Nocrac NS-6 and NS-30 (both made by Ouchi Shinko Chemical Industry Co., Ltd.), and Yoshinox 425 (made by Yoshitomi Pharmaceutical Industries, Ltd.). The antioxidant is generally included in an amount of at least 0 part, preferably at least 0.05 part, more preferably at least 0.1 part, and most preferably at least 0.2 part by weight, but not more than 3 parts, preferably not more than 2 parts, more preferably not more than 1 part, and most preferably not more than 0.5 part by weight, per 100 parts by weight of component (A). Too much antioxidant may fail to achieve good rebound and durability characteristics.

It is preferable for the rubber composition for a golf ball to include an organosulfur compound. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salts thereof, and organosulfur compounds having 2 to 4 sulfurs, such as diphenylpolysulfides, dibenzylpolysulfides, dibenzoylpolysulfides, dibenzothiazoylpolysulfides and dithiobenzoylpolysulfides. Diphenyldisulfide and the zinc salt of pentachlorothiophenol are especially preferred. It is recommended that the organosulfur compound be included in an amount of generally at least 0.1 part, preferably at least 0.2 part, and most preferably at least 0.5 part by weight, but generally not more than 5 parts, preferably not more than 4 parts, more preferably not more than 3 parts, and most preferably not more than 2 parts by weight, per 100 parts by weight of component (A).

In the other aspect, the invention provides a golf ball comprising a hot molded product of the rubber composition for a golf ball as a constituent component. The composition may be heated and cured or vulcanized under the same conditions as used with well-known rubber composition for a golf ball. For example, vulcanization may be effected by heating at a temperature of about 100 to 200° C. for a time of about 10 to 40 minutes.

The construction of the inventive golf ball is not particularly limited as long as it comprises a hot molded product of the rubber composition for a golf ball as a constituent component. Various forms of golf balls are possible including one-piece golf balls in which the hot molded product is directly embodied as a ball, two-piece solid golf balls in which the hot molded product is a solid core and a cover is formed therearound, multi-piece solid golf balls in which the hot molded product is a solid core and a cover of two or more layers is formed therearound, and wound golf balls in which the hot molded product is a center core. Of these, two-piece and multi-piece solid golf balls in which a hot molded product of the inventive rubber composition for a golf ball is embodied as a solid core are preferred because the characteristics of the hot molded product are most effectively exploited so that the finished golf ball is endowed with better rebound.

In the embodiment wherein a hot molded product of the inventive rubber composition for a golf ball is embodied as a solid core, the solid core generally has a diameter of at least 30.0 mm, preferably at least 32.0 mm, more preferably at least 35.0 mm, even more preferably at least 37.0 mm, and up to 41.0 mm, preferably up to 40.5 mm, more preferably up to 40.0 mm, even more preferably up to 39.5 mm. For two-piece solid golf balls, the solid core generally has a diameter of at least 37.0 mm, preferably at least 37.5 mm, more preferably at least 38.0 mm, even more preferably at least 38.5 mm, and up to 41.0 mm, preferably up to 40.5 mm, more preferably up to 40.0 mm. For three-piece solid golf balls, the solid core generally has a diameter of at least 30.0 mm, preferably at least 32.0 mm, more preferably at least 34.0 mm, even more preferably at least 35.0 mm, and up to 40.0 mm, preferably up to 39.5 mm, more preferably up to 39.0 mm.

The hot molded product has a hardness that is not particularly limited and a hardness distribution in cross section which may be flat from the center to the surface of the molded product or have a hardness difference between the center and the surface of the molded product.

As mentioned above, the golf ball of the invention may take any of various forms. Particularly when the golf ball is a one-piece golf ball or a golf ball having a solid core or solid center, it is recommended that said one-piece golf ball or solid core or solid center yield an amount of deflection or deformation under an applied load of 980 N (100 kg) of generally at least 2.0 mm, preferably at least 2.5 mm, more preferably 2.8 mm, most preferably at least 3.2 mm, and up to 6.0 mm, preferably up to 5.5 mm, more preferably up to 5.0 mm, most preferably up to 4.5 mm. Too small a deflection may worsen the feel of the ball upon impact and, particularly on long shots such as with a driver in which the ball incurs a large deformation, may subject the ball to an excessive rise in spin, reducing the carry. On the other hand, if the hot-molded product is too soft, the golf ball tends to have a dead feel when hit, an inadequate rebound that results in a poor carry, and a poor durability to cracking with repeated impact.

When the golf ball of the invention is embodied as a two-piece or multi-piece solid golf ball, it may be manufactured by using the hot molded product as the solid core, and injection molding or compression molding a well-known cover stock or intermediate layer material therearound.

Examples of the base of the cover stock or intermediate layer material include thermoplastic or thermosetting polyurethane elastomers, polyester elastomers, ionomer resins, polyolefin elastomers and mixtures thereof. Any one or mixture of two or more thereof may be used, although the use of a thermoplastic polyurethane elastomer or ionomer resin is especially preferred.

Illustrative examples of thermoplastic polyurethane elastomers that may be used herein include commercial products in which the diisocyanate is aliphatic or aromatic, such as Pandex T7298, Pandex T7295, Pandex T7890, Pandex TR3080, Pandex T8295 and Pandex T8290 (all manufactured by DIC Bayer Polymer, Ltd.). Illustrative examples of suitable commercial ionomer resins include Surlyn 6320 and Surlyn 8120 (both products of E.I. du Pont de Nemours and Co., Inc.), and Himilan 1706, Himilan 1605, Himilan 1855, Himilan 1601 and Himilan 1557 (all products of DuPont-Mitsui Polychemicals Co., Ltd.).

Together with the base described above, the cover or intermediate layer material may include also, as an optional constituent, polymers (e.g., thermoplastic elastomers) other than the foregoing. Specific examples of polymers that may be included as optional constituents include polyamide elastomers, styrene block elastomers, hydrogenated polybutadienes and ethylene-vinyl acetate (EVA) copolymers.

Two-piece solid golf balls and multi-piece solid golf balls according to the invention can be manufactured by a known method. No particular limitation is imposed on the manufacturing method, although two-piece and multi-piece solid golf balls are preferably manufactured by employing a method in which the above-described hot-molded product is placed as the solid core within a given injection mold, following which a predetermined method is used to inject the above-described cover material over the core in the case of a two-piece solid golf ball, or to successively inject the above-described intermediate layer material and cover material in the case of a multi-piece solid golf ball. In some cases, the golf ball may be produced by molding the cover material under an applied pressure.

It is recommended that the intermediate layer in a multi-piece solid golf ball have a thickness of at least 0.5 mm, and preferably at least 1.0 mm, but not more than 3.0 mm, preferably not more than 2.5 mm, more preferably not more than 2.0 mm, and most preferably not more than 1.6 mm.

Moreover, in both two-piece solid golf balls and multi-piece solid golf balls, it is recommended that the cover have a thickness of at least 0.7 mm and preferably at least 1.0 mm, but not more than 3.0 mm, preferably not more than 2.5 mm, more preferably not more than 2.0 mm, and most preferably not more than 1.6 mm.

The golf ball of the invention can be manufactured for competitive use by imparting the ball with a diameter and weight which conform with the Rules of Golf; that is, a diameter of at least 42.67 mm and a weight of not more than 45.93 g. It is recommended that the diameter be no more than 44.0 mm, preferably no more than 43.5 mm, and most preferably no more than 43.0 mm; and that the weight be at least 44.5 g, preferably at least 45.0 g, more preferably at least 45.1 g, and most preferably at least 45.2 g.

EXAMPLE

The following examples and comparative examples are provided to illustrate the invention, and are not intended to limit the scope thereof.

Examples 1-6 & Comparative Examples 1-3

A series of rubber compositions were prepared by combining components in accordance with the recipe shown in Table 1. They were milled on a kneader (Moriyama Mfg. Co., Ltd.) at 50-90° C., then vulcanized at 160° C. for 15 minutes, forming two-piece golf ball cores having an outer diameter of 39.2 mm.

The cores were determined for a deflection amount under a load of 100 kg (980 N) and an initial velocity at temperatures of 23° C. and 0° C. The results are also shown in Table 1.

The data in Table 1 suggest that use of a base rubber having methacryloxy-modified silicone rubber powder incorporated therein restrains a lowering of core hardness and achieves both a satisfactory rebound property (as demonstrated by a high core initial velocity) and a minimized decline of core initial velocity in a low temperature environment.

Japanese Patent Application No. 2003-347855 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

TABLE 1

| Formulation (pbw) | Example | | | | | | Comparative Example | | |
|---|---|---|---|---|---|---|---|---|---|
| | 1 | 2 | 3 | 4 | 5 | 6 | 1 | 2 | 3 |
| Core composition | | | | | | | | | |
| (A) BR | 90 | 80 | 70 | 60 | 40 | 20 | 100 | 80 | 60 |
| Methacryloxy-modified silicone rubber powder | 10 | 20 | 30 | 40 | 60 | 80 | — | — | — |
| (B) Zinc acrylate | 26 | 26 | 26 | 26 | 26 | 26 | 26 | 26 | 26 |
| (C) Zinc oxide | 20.5 | 19 | 17.5 | 16 | 13 | 10 | 22 | 19 | 16 |
| Unmodified silicone rubber powder | — | — | — | — | — | — | — | 20 | 40 |
| Dicumyl peroxide | 1.2 | 1.2 | 1.2 | 1.2 | 1.2 | 1.2 | 1.2 | 1.2 | 1.2 |
| Core properties | | | | | | | | | |
| Deflection under 100 kg load (mm) | 3.22 | 3.28 | 3.36 | 3.42 | 3.47 | 3.31 | 3.17 | 3.77 | 4.29 |
| Initial velocity at 23° C. (m/s) | 77.60 | 77.73 | 77.85 | 77.99 | 78.33 | 78.55 | 77.46 | 77.05 | 76.79 |
| Initial velocity at 0° C. (m/s) | 76.28 | 76.43 | 76.61 | 76.83 | 77.38 | 78.05 | 76.11 | 75.73 | 75.67 |
| Initial velocity drop | 1.32 | 1.30 | 1.24 | 1.16 | 0.95 | 0.50 | 1.35 | 1.32 | 1.12 |

BR: BR01 by JSR Corporation
Methacryloxy-modified silicone rubber powder: DY33-719 by Dow Corning-Toray Silicone Co., Ltd.
Unmodified silicone rubber powder: Torefin E-604 by Dow Corning-Toray Silicone Co., Ltd.
Zinc acrylate: by Nippon Distill Industry Co., Ltd.
Dicumyl peroxide: by NOF Corporation
Deflection under 100 kg load (mm): Measured was an amount of deflection of the core under an applied load of 100 kg. Larger values indicate softer cores.
Initial velocity (m/s): An initial velocity was measured using the same type of initial velocity instrument as the USGA rotary drum initial velocity instrument approved by R&A. The core was conditioned at a temperature of 23±1° C. or 0±1° C. for at least 3 hours and tested in a chamber at room temperature of 23±1° C. The core was hit with a head having a striking mass of 250 pounds (113.4 kg) at a hitting speed of 143.8 ft/s (43.83 m/s). One dozen of cores were hit each four times, and the time of passage across a distance of 6.28 feet (1.91 m) was measured, from which the initial velocity was computed. This cycle was completed within about 15 minutes.
Initial velocity drop: The initial velocity of the core conditioned at 23° C. minus the initial velocity at 0C.

It is evident from the results of Examples and Comparative Examples that the cores in Examples are improved in rebound whereas the cores in Comparative Examples using unmodified silicone rubber powder are drastically reduced in hardness and in rebound.

The invention claimed is:

1. A golf ball, comprising as a constituent component a hot molded product of the rubber composition,
    wherein the rubber composition comprises (A) a base rubber, (B) an unsaturated carboxylic acid and/or a metal salt thereof, and (C) an organic peroxide,
    wherein the base rubber (A) comprises (a-1) a methacryloxy and/or acryloxy-modified silicone rubber powder which is partially crosslinked, and
    wherein the base rubber (A) further comprises (a-2) a peroxide-crosslinkable rubber other than said methacryloxy and/or acryloxy-modified silicone rubber powder (a-1), wherein said peroxide-crosslinkable rubber (a-2) comprises a polybutadiene containing at least 40 wt % of cis-1,4 bonds and is present in an amount of not than 40% by weight based on the total weight of the base rubber (A), and wherein said methacryloxy and/or acryloxy-modified silicone rubber powder (a-1) is present in an amount of 60% by weight or more based on the total weight of the base rubber.

2. The golf ball of claim 1, comprising a core formed by hot molding the rubber composition for a golf ball and a cover of at least one layer enclosing the core.

3. The golf ball of claim 1, wherein the peroxide-crosslinkable rubber (a-2) comprises a polybutadiene having a dispersity Mw/Mn of at least 2.0 and up to 8.0.

4. The golf ball of claim 1, wherein the peroxide-crosslinkable rubber (a-2) comprises a polybutadiene obtained by using a polymerization catalyst selected from the group consisting of nickel, cobalt and rare earth-based catalysts.

* * * * *